United States Patent
Ni et al.

(10) Patent No.: US 8,558,478 B2
(45) Date of Patent: Oct. 15, 2013

(54) HYBRID LAMP POWER CIRCUIT

(75) Inventors: Qian Ni, ShangHai (CN); Devin Sun, ShangHai (CN); Peter Lucz, Budapest (HU); Balazs Torok, Budapest (HU)

(73) Assignee: General Electric Company, Schenectady, NY (US)

( * ) Notice: Subject to any disclaimer, the term of this patent is extended or adjusted under 35 U.S.C. 154(b) by 278 days.

(21) Appl. No.: 13/076,553

(22) Filed: Mar. 31, 2011

(65) Prior Publication Data

US 2012/0187834 A1    Jul. 26, 2012

(30) Foreign Application Priority Data

Jan. 22, 2011   (CN) .......................... 2011 1 0037135

(51) Int. Cl.
*H05B 37/02*    (2006.01)

(52) U.S. Cl.
USPC ............................. 315/291; 315/324; 315/178

(58) Field of Classification Search
USPC ....... 315/51, 178, 194, 209 R, 210, 224–226, 315/246–247, 250, 291, 307, 308, 312, 324, 315/DIG. 4, DIG. 5, DIG. 7
See application file for complete search history.

(56) References Cited

U.S. PATENT DOCUMENTS

2010/0060187 A1*   3/2010  Newman et al. .............. 315/291

FOREIGN PATENT DOCUMENTS

| EP | 1883099 A2 | 1/2008 |
|---|---|---|
| JP | 2009164072 A | 7/2009 |

OTHER PUBLICATIONS

PCT Search Report and Written Opinion dated May 3, 2012 from corresponding Application No. PCT/US2012/021491.

* cited by examiner

*Primary Examiner* — Shawki Ismail
*Assistant Examiner* — Christopher Lo
(74) *Attorney, Agent, or Firm* — Fay Sharpe LLP

(57) ABSTRACT

A hybrid lamp apparatus is presented having a primary lamp circuit with a CFL and an electronic ballast, as well as a Halogen or incandescent secondary lamp circuit with a control circuit that shuts off the secondary lamp a time period after powerup, where the secondary lamp time period varies according to the amount of time the apparatus was previously unpowered.

11 Claims, 3 Drawing Sheets

HYBRID LAMP POWER CIRCUIT

CROSS-REFERENCE TO RELATED APPLICATIONS

This application claims priority to and the benefit of Chinese patent application No. 201110037135.1 filed Jan. 22, 2011, the entirety of which is hereby incorporated by reference.

BACKGROUND OF THE DISCLOSURE

In recent years, the inefficiencies of conventional incandescent bulbs has lead to development of compact fluorescent lamps (CFLs), halogen lamps, LED array lighting devices, and other more efficient forms of light sources. High wattage CFL or covered CFLs, however, often suffer from slow run up of the lumen output when power is initially applied. Hybrid lamps have been proposed, including a main CFL lamp as well as an auxiliary lamp to augment the lighting provided by CFL, particularly at powerup. The secondary lamp, however, may generate heat and disrupt the operation of the CFL. Accordingly, there is a need for improved hybrid lamps which provide the advantages of CFL technology in terms of efficiency and light output, with the capability to provide supplemental lumen output at powerup while mitigating or avoiding excess thermal problems.

SUMMARY OF THE DISCLOSURE

The present disclosure provides hybrid lamp apparatus which turns the auxiliary lamp off after a time period following application of power to provide supplemental light output while the main lamp circuitry warms up and to avoid or mitigate adverse thermal effects associated with the operation of the secondary light source. The hybrid lamp includes a rectifier along with primary and secondary lamp circuits. The primary or main lamp circuit includes a compact fluorescent lamp (CFL) as well as an electronic ballast with an output coupled to provide AC output power to the compact fluorescent lamp. The auxiliary or secondary lamp circuit includes a lamp, a switching device and a control circuit. In certain embodiments, the auxiliary lamp is a halogen lamp coupled in series with the switching device between upper and lower DC bus outputs of the rectifier. In other implementations, an incandescent auxiliary lamp can be used. In some embodiments, moreover, the switching device can be a triac.

The control circuit provides a signal to the switching device to a first switching state allow current to flow in the auxiliary lamp when or shortly after AC input power is applied to the rectifier, and to thereafter turn off the auxiliary lamp a time period after the AC input power is applied to the rectifier.

In certain embodiments, the auxiliary lamp on period is variable depending on the amount of time the rectifier was unpowered prior to the AC input power being applied to the rectifier. In this manner, the auxiliary lamp can be turned off quicker in conditions where the lumen output of the main light source will ramp up faster.

The control circuit in certain embodiments includes a timing circuit with one or more capacitances and the time period is determined based on the charging condition of the capacitance, such as capacitor charging or discharging times.

In certain embodiments, the control circuit includes first and second series branch circuits extending between upper and lower DC bus outputs of the rectifier. The first series circuit includes a resistance between the upper DC bus output and a first intermediate node, as well as a control switching device coupled from the intermediate node to the lower DC bus output. The second series circuit has a second resistance between the upper DC bus and a second intermediate node, a third resistance between the second intermediate node and the lower DC bus, and a capacitance in parallel with the third resistance. A zener diode is included, having an anode coupled with the control switch control terminal and a cathode terminal coupled with the second intermediate node of the second series circuit branch.

BRIEF DESCRIPTION OF THE DRAWINGS

One or more exemplary embodiments are set forth in the following detailed description and the drawings, in which.

DETAILED DESCRIPTION OF THE PREFERRED EMBODIMENTS

Figure 1:
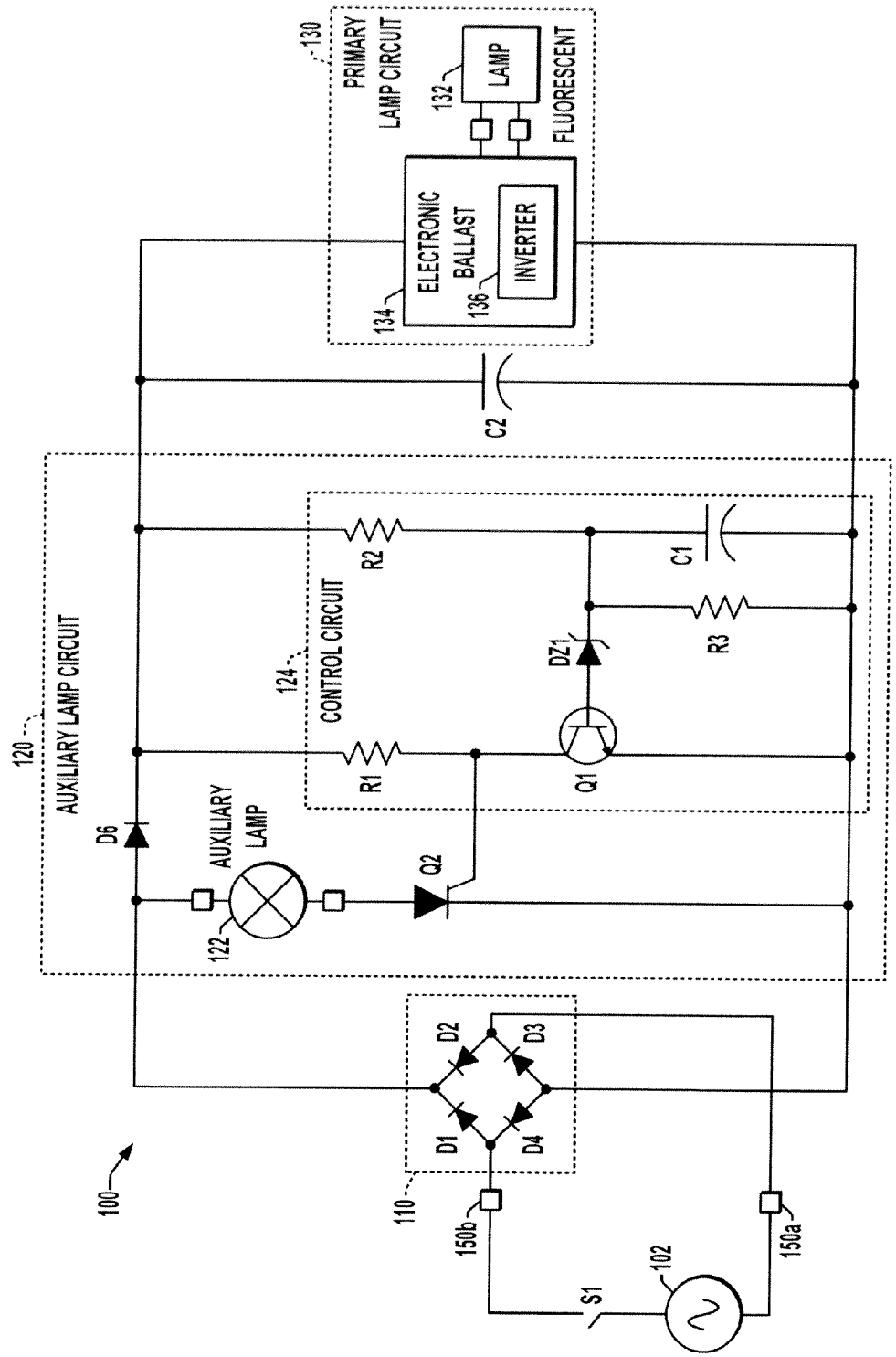
FIG. 1 is a schematic diagram illustrating an exemplary hybrid lamp apparatus with primary and auxiliary lamp circuitry in accordance with one or more aspects of the disclosure.

Referring now to the drawings, like reference numerals are used to refer to like elements throughout and the various features are not necessarily drawn to scale.

Figure 4:
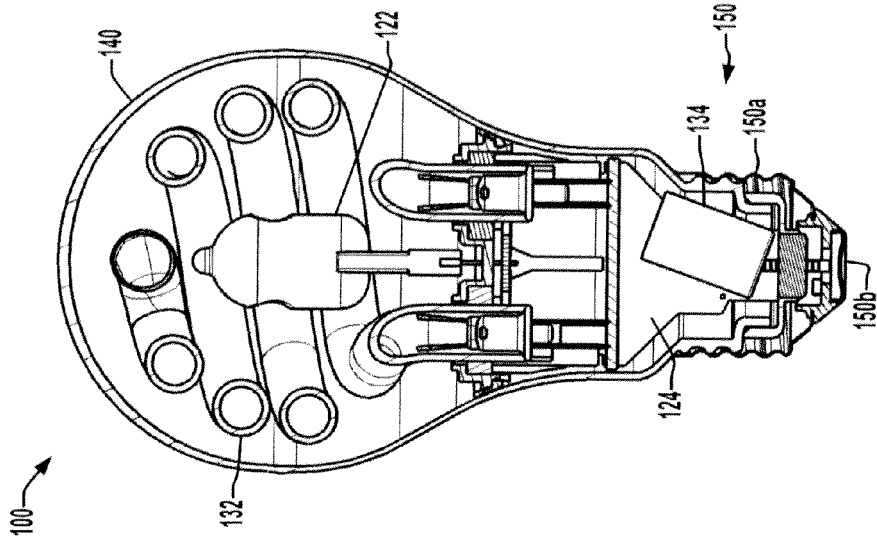
FIG. 4 is a sectional side elevation view of an exemplary hybrid lamp apparatus with a halogen auxiliary lamp axially disposed within loops of a CFL lamp.

FIGS. 1 and 4 illustrate an exemplary hybrid lamp apparatus 100 with primary and secondary (auxiliary) lamp circuits 130 and 120, respectively. As seen in FIG. 1, the apparatus 100 includes an input rectifier 110 including a full wave bridge formed by diodes D1, D2, D3, and D4, providing an input connected to terminals 150a and 150b to receive AC input power from a single-phase AC source 102. The rectifier 110 provides a DC output creating a DC bus voltage used to power the lamp circuits 120 and 130 in certain embodiments. In other embodiments, the secondary lamp circuit 120 may be powered separately from the DC bus, such as using the line AC input power or a separate DC bus. The DC bus circuit in the illustrated example may also include one or more filter capacitors C2 coupled between the upper and lower DC bus outputs provided by the rectifier 110.

A switch S1 (e.g., user-operated wall switch or other electrical switch) may be coupled in series between the hybrid lamp 100 and the AC source 102 for selective application or removal of AC power to/from the apparatus 100. In the embodiment of FIG. 4, an Edison base 50 provides a first (shell) contact 150a as well as an eyelet contact 150b with the lamp 100 receiving power via these connections from a corresponding lamp socket, and the primary and auxiliary lamps are housed within a transparent or translucent outer bulb structure 140.

The hybrid lamp apparatus 100 of FIG. 1 also includes a diode D6 with an anode coupled to the upper DC bus output of the rectifier 110 and a cathode coupled with the primary lamp circuit 130.

The primary lamp circuit 130 includes a compact fluorescent lamp (CFL) 132 along with an electronic ballast 134 receiving DC input power from the rectifier 110. The ballast 134 includes an inverter 136 and may also include a transformer (not shown) and provides AC output power to drive the compact fluorescent lamp 132 when or shortly after power is applied from the source 102 to the input of the rectifier 110, where the ballast 134 may begin operation sometime after the switch S1 is closed due to startup circuitry and the rise time associated with charging the capacitor C2.

The auxiliary lamp circuit 120 includes an auxiliary lamp 122 for supplementing the light output provided by the primary lamp 132, particularly during startup. Any form of auxiliary light source may be used, whether a single light or multiple lighting devices. In certain embodiments, a halogen lamp 122 is provided. In other embodiments, the auxiliary lamp 122 can be an incandescent lamp (not shown), with appropriate switched connection for powering the auxiliary lamp from a suitable AC or DC power source. In the embodiment of FIG. 4, a halogen auxiliary lamp 122 is located within loops of the primary CFL lamp 132 and is turned on by a switching device Q2 (FIG. 1) at or shortly after power is applied to the rectifier 110. In this regard, the initial application of power via the switch Q2 may by substantially concurrent with power being applied to the rectifier 110 (via closure of the switch S1) or may take a finite amount of time for response by the switch Q2 and associated triggering circuitry in the auxiliary lamp circuit 120.

Any type of switching device Q2 may be used, such as a true as shown in FIG. 1. The device Q2 in this implementation is coupled with the rectifier 110 in series with the auxiliary lamp 122 between the upper and lower DC rectifier outputs, and the control terminal (gate) of the triac switch Q2 is operated by a control circuit 124. Q2 operates in a first switching state (e.g., ON when a certain positive voltage is applied between the control gate and the cathode of Q2) to allow current to flow in the auxiliary lamp 122 and Q2 is further operative in a second switching state (e.g., OFF when the control gate of Q2 is grounded via the control circuit 124) to prevent current flow in the auxiliary lamp 122.

A first series circuit branch of the control circuit 124 is used to generate the control signal for operating Q2. The first circuit branch in the embodiment of FIG. 1 is coupled between upper and lower DC bus outputs of the rectifier 110 with the diode D6 connected in the upper DC circuit path between the connections of the auxiliary lamp 122 and the upper connections of the control circuit 124. The first circuit branch of the control circuit 124 includes a first resistor R1 coupled between the upper DC bus output and a first intermediate node coupled to the control gate of the triac Q2. A control switching device Q1 is coupled from the first intermediate node to the lower DC bus output Q1 to selectively ground the intermediate node and thus to turn Q2 off. When power is initially provided to the device 100, Q1 is off (non-conductive), and the DC bus voltage provided by the rectifier 110 raises the control gate of Q2 through resistor R1. In this manner, the auxiliary control circuit 124 provides the control signal to set the switching state of Q2 to the first switching state (ON) when or shortly after AC input power is applied to the rectifier 110. Q1 can be any controllable switching device, such as a bipolar transistor in the embodiment of FIG. 1. Q1 has a collector coupled with the resistor R1 and the gate of Q2 at the first intermediate node, as well as an emitter coupled with the lower DC bus output, along with a control terminal (base).

A second series circuit branch of the control circuit 124 extends between the upper and lower DC bus outputs of the rectifier 110, and includes a resistor R2 coupled between the upper DC bus output and a second intermediate node, as well as a parallel combination of a third resistor R3 and a capacitor C1 coupled between the second intermediate node and the lower DC bus output. The capacitance C1 can be one or more capacitive devices, coupled with one another in series and/or in parallel. A Zener diode DZ1 connects the two circuit branches of the control circuit 124, with an anode terminal coupled with the base of Q1 and a cathode terminal coupled with the second intermediate node joining R2, R3, and C1.

As the system power is applied via switch S1, the Zener DZ1 will not conduct initially, and thus Q1 is initially off. This allows the switch Q2 to conduct and turn on the auxiliary lamp 122 since the triac Q2 is triggered by the current through the resistor R1 from the upper DC bus connection. The application of power also begins charging of the capacitance C1 by the current through the resistor R2. When the voltage across the capacitor C1 (the second intermediate node voltage) reaches roughly the breakdown voltage of the Zener, DZ1 begins to conduct, thereby providing a base current to Q1. This turns Q1 on (conductive), which pulls down the voltage between the gate and cathode of Q2 to around zero. The triac Q2 thus turns off the halogen lamp 122.

Figure 2:
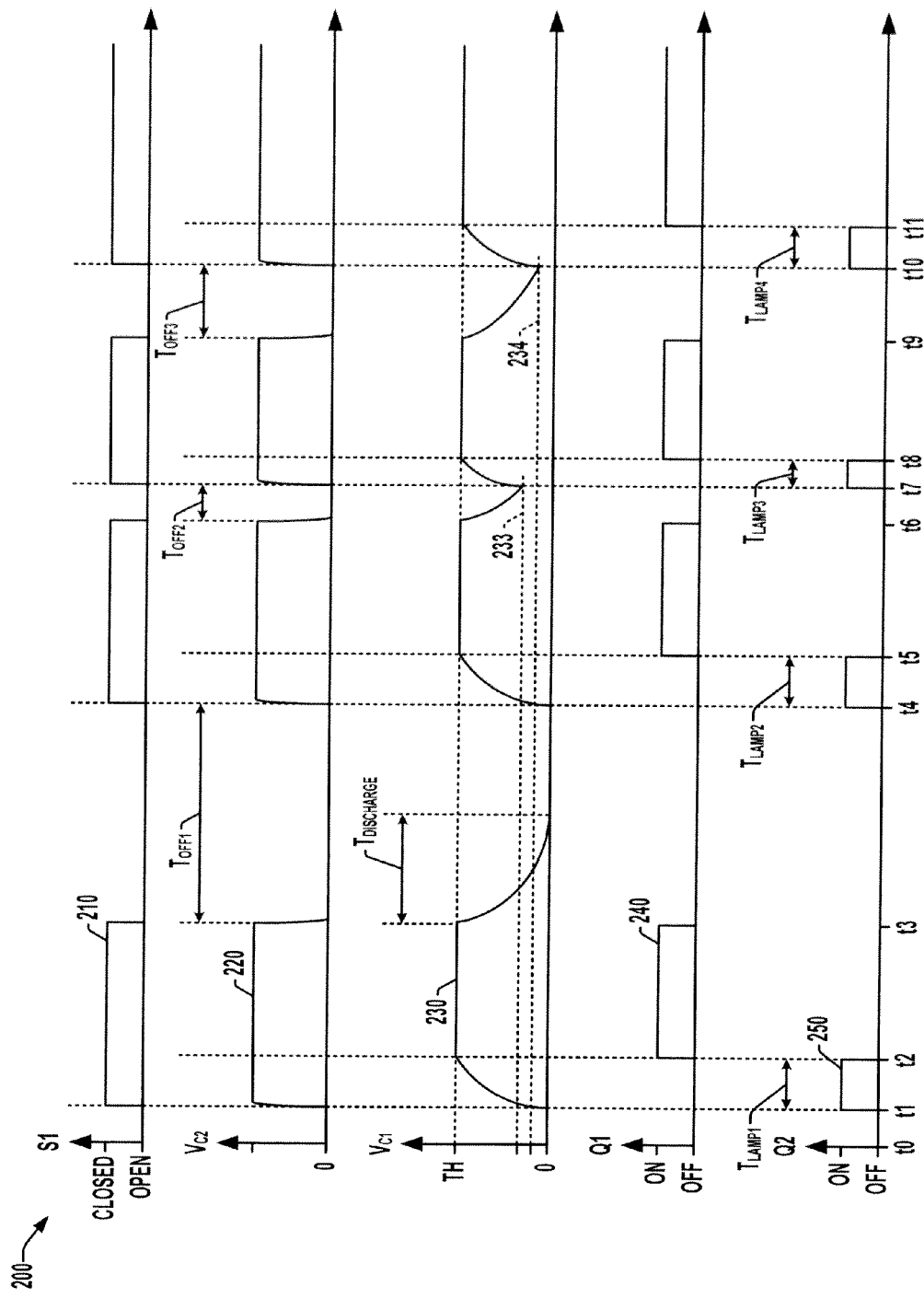
FIG. 2 is a graph illustrating various exemplary waveforms in the hybrid lamp apparatus of FIG. 1.
Figure 3:
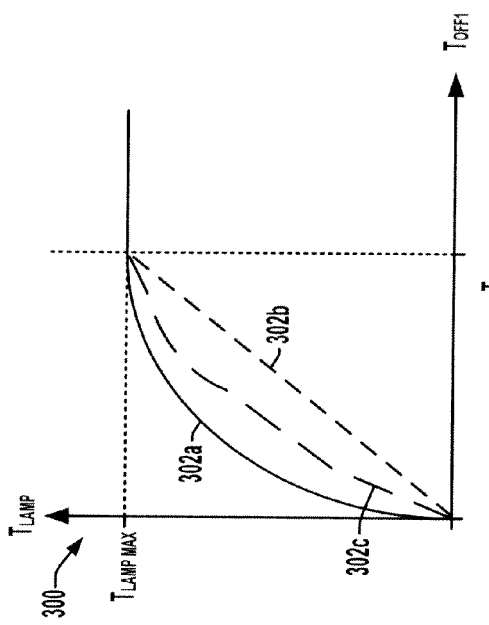
FIG. 3 is a graph illustrating various exemplary auxiliary lamp on-time curves as a function of preceding device off-time for the hybrid lamp of FIG. 1.

Referring also to FIGS. 2 and 3, the control circuit 124 thus includes a timing circuit with the charging condition of C1 determining a time period $T_{LAMP}$ between initial application of power to the rectifier 110 and the time when the auxiliary lamp 122 is turned off. In the illustrated embodiment, the halogen on-time is set by the values of the resistances R2 and R3, the capacitance and ESR (equivalent series resistance) of C1, and the breakdown voltage of the Zener diode DZ1. Other timing circuits can be used in conjunction with halogen, incandescent or other types of secondary light sources to provide turn-off timing based on a charge state of a control circuit capacitance. In certain applications, typical desired on-times $T_{LAMP}$ may be in a range of about 30 seconds to about 2 minutes, depending on an expected ramp-up time for the primary lamp circuit, for instance, such that the auxiliary lamp 122 provides supplemental lumen output until the main lamp 132 is at or near rated light output, with considerations for thermal effects of the auxiliary lamp being on, with the con circuit design being tailored to a given set of these specifications.

FIG. 2 shows a graph 200 with waveform timing diagrams for various waveforms in the apparatus 100 of FIG. 1. A curve 210 shows the state of the power switch S1 (ON or OFF), for an exemplary user switching pattern, and the resulting DC bus voltage waveform 220 ($V_{C2}$) is shown across the DC bus capacitor C2, which rises through rectification by the rectifier diodes D1-D4. Graph 200 also shows a voltage waveform 230 corresponding to the voltage $V_{C1}$ across the timing capacitor C1, which rises (beginning with the rise of the DC bus voltage $V_{C2}$) according to the associated time constant set by the control circuit resistor R2 and the capacitance value of C1 to a threshold TH at which the Zener DZ1 turns on Q1 (thereby turning off Q2 and the halogen lamp 122). When Vc1 reaches threshold TH, the voltage of C1 will be clamped slightly above TH (e.g., around TH+Vbe of Q1, around 0.7V).

FIG. 2 also shows a curve 240 representing the on/off (conductive/non-conductive state of the switch Q), as well as a switch state curve 250 representing the on/off (conductive/non-conductive) of the secondary lamp switch Q2. In this regard, the on condition of switch Q2 substantially represents the on-time $T_{LAMP}$ of the auxiliary lamp 122 referenced to the time at which the power is applied to the apparatus 100 (e.g., when a user closes switch S1 in FIG. 1), with minor variations for the rise of the DC bus voltage and operation to turn Q2 and the lamp 122 on.

The sequence shown in FIG. 2 assumes that the device 100 has been off for a lengthy period of time such that capacitor C1 is completely discharged at time t0. As noted above, and as depicted in the exemplary switch sequence shown in FIG. 2, the DC bus 220 rises with switch S1 being turned on (curve 210 in the 'closed' state) at time t1, and the switch Q2 (curve 250) turns on the lamp 122 substantially at t1. Thereafter, the rise time of $V_{C1}$ (curve 230) determines the time t2 at which the control circuit 124 turns off the auxiliary lamp 122 (when $V_{C1}$ reaches or exceeds the threshold TH). This sets the switching state of Q2 to the non-conductive or off state a time period $T_{LAMP1}$ after the AC input power is applied to the rectifier 110 ($T_{LAMP1}$ is approximately equal to t2-t1 in this case).

Referring also to FIG. 3, since C1 began charging at t1 from a completely discharged state, the time $T_{LAMP1}$ is the maximum lamp on-time for the circuit, shown in FIG. 3 as time $T_{LAMP\ MAX}$. FIG. 3 provides a graph 300 of auxiliary lamp on-time $T_{LAMP}$ as a function of preceding device off-time $T_{OFF}$, including an exemplary curve 302a representing the response of the device 100 using a capacitor charging state of C1 to set the time $T_{LAMP}$, where the curves 302a, 302b, and 302c in this example have maximum values at $T_{LAMP\ MAX}$. The embodiment of FIG. 1, moreover, provides a generally curvilinear relationship 302a based on capacitive charging, whereas other embodiments are possible in which a linear relationship can be provided (curve 302b) and/or where the relationship includes both linear and curvilinear portions (e.g., curve 302c), with or without a maximum value $T_{LAMP\ MAX}$.

In the illustrated embodiment, moreover, the time period $T_{LAMP}$ is variable depending on the amount of time the rectifier 110 was unpowered prior to the AC input power being applied to the rectifier 110. This is due to the charging state of C1 when power is applied. In general, if C1 is completely discharged upon application of input AC power to the rectifier 110, the time period $T_{LAMP}$ is generally $T_{LAMP\ MAX}$, such as about 1 minute in one embodiment. Thus, if the system power is off for a long period, C1 will completely discharge through R3. However, if C1 is partially charged when the rectifier 110 turns on again, the lamp on-time $T_{LAMP}$ will be less than $T_{LAMP\ MAX}$, as shown in FIG. 2. In particular, FIG. 2 shows a discharge time $T_{DISCHARGE}$ for the voltage $V_{C1}$ across C1 to fully discharge from its maximum value, in this case shown beginning at time t3 when the switch S1 is opened. If the system is powered off for less than this threshold $T_{DISCHARGE}$, the halogen on-time $T_{LAMP}$ will be less than $T_{LAMP\ MAX}$. In the illustrated switching sequence of FIG. 2, the user waits a sufficient time $T_{OFF1}$ (longer than $T_{DISCHARGE}$) before again closing the switch S1 at time t4. In this case, the resulting time $T_{LAMP}$ (ending at time t5) during which the auxiliary lamp 122 is on will be equal to $T_{LAMP\ MAX}$.

In the example of FIG. 2, the user then turns the switch S1 off at t0, but waits a shorter time $T_{OFF2}$ before again closing 81 at t7. However, C1 is not completely discharged at t7, with the capacitor voltage $V_{C1}$ having only reached anon-zero voltage level 233. The capacitor C1 then begins charging and reaches the threshold TH at time 18 to turn off the auxiliary lamp 122, where the resulting halogen on-time $T_{LAMP3}$ (t8-t7) is less than $T_{LAMP\ MAX}$. Thus, when the hybrid lamp apparatus 100 is turned off only for a shorter period than the threshold time $T_{DISCHARGE}$, the secondary lamp 122 is not operated for as long a time, to accommodate designs in which the primary light circuit 130 has a faster lumen ramp-up as not yet having completely cooled down to the ambient temperature. This advantageously reduces or mitigates heat stress to the non-cooled components of the device 100. The example of FIG. 2 continues with the user switching off power at t9, and switching the power back on at t10. In this situation, the capacitor voltage $V_{C1}$ has decreased to another non-zero level 234 at time t10, whereupon the auxiliary lamp again goes on at about t10 and goes off at t11 once the capacitor voltage $V_{C1}$ has again reached the threshold TH. Again, the corresponding system off-time $T_{OFF3}$ is less than $T_{DISCHARGE}$ and the resulting secondary lamp on-time $T_{LAMP4}$ t11-t10) is less than $T_{LAMP\ MAX}$.

As seen above, the exemplary hybrid lamp apparatus 100 combines the advantages of a CFL's high efficiency when the lamp 100 is operated for long periods of time (e.g., one or two minutes or more) and also provides stabilized light output from the initial user activation of the power switch S1 through augmentation by powering the auxiliary lamp 122, while mitigating or avoiding excess thermal problems by intelligent adjustment of the halogen on-time based at least partially on the prior system off-time.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. Although a particular feature of the disclosure may have been illustrated and/or described with respect to only one of several implementations, such feature may be combined with one or more other features of the other implementations as may be desired and advantageous for any given or particular application. Furthermore, references to singular components or items are intended, unless otherwise specified, to encompass two or more such components or items. Also, to the extent that the terms "including", "includes", "having", "has", "with", or variants thereof are used in the detailed description and/or in the claims, such terms are intended to be inclusive in a manner similar to the term "comprising". The invention has been described with reference to the preferred embodiments. Modifications and alterations will occur to others upon reading and understanding the preceding detailed description. It is intended that the invention be construed as including all such modifications and alterations.

The following is claimed:

1. A hybrid lamp apparatus, comprising:
  a rectifier with an input to receive AC input power;
  a primary lamp circuit, comprising:
    a compact fluorescent lamp, and
    an electronic ballast with a ballast input to receive DC input power, and a ballast output coupled with the compact fluorescent lamp to provide AC output power to the compact fluorescent lamp; and
  an auxiliary lamp circuit, comprising:
    an auxiliary lamp,
    a switching device coupled with the auxiliary lamp, the switching device being operative in a first switching state to allow current to flow in the auxiliary lamp and in a second switching state to prevent current flow in the auxiliary lamp, and
    a control circuit providing a control signal to set the switching state of the switching device to the first switching state when or shortly after AC input power is applied to the rectifier, and to thereafter set the switching state of the switching device to the second switching state to turn off the auxiliary lamp a time period after the AC input power is applied to the rectifier, where the control circuit comprises:

a first series circuit branch extending between upper and lower DC bus outputs of the rectifier, including a first resistance coupled between the upper DC bus output and a first intermediate node, and a control switching device with a first switch terminal coupled with the second terminal of the first resistance at the first intermediate node, a second switch terminal coupled with the lower DC bus output, and a control switch control terminal, a second series circuit branch extending between the upper and lower DC bus outputs of the rectifier, including a second resistance coupled between the upper DC bus output and a second intermediate node, a third resistance coupled between the second intermediate node and the lower DC bus output, and a capacitance coupled in parallel with the third resistance between the second intermediate node and the lower DC bus output, and a zener diode with an anode terminal coupled with the control switch control terminal and a cathode terminal coupled with the second intermediate node of the second series circuit branch.

2. The hybrid lamp apparatus of claim 1, where the time period is variable depending on an amount of time the rectifier was unpowered prior to the AC input power being applied to the rectifier.

3. The hybrid lamp apparatus of claim 2, where the auxiliary lamp is a halogen lamp, and where the auxiliary lamp and the switching device are coupled in series with one another between upper and lower DC bus outputs of the rectifier.

4. The hybrid lamp apparatus of claim 3, where the control circuit includes a timing circuit with at least one capacitance, and where the time period is determined at least partially according to a charging condition of the at least one capacitance.

5. The hybrid lamp apparatus of claim 2, where the control circuit includes a timing circuit with at least one capacitance, and where the time period is determined at least partially according to a charging condition of the at least one capacitance.

6. The hybrid lamp apparatus of claim 1, where the auxiliary lamp is a halogen lamp, and where the auxiliary lamp and the switching device are coupled in series with one another between upper and lower DC bus outputs of the rectifier.

7. The hybrid lamp apparatus of claim 6, where the control circuit includes a timing circuit with at least one capacitance, and where the time period is determined at least partially according to a charging condition of the at least one capacitance.

8. The hybrid lamp apparatus of claim 4, where the control circuit includes a timing circuit with at least one capacitance, and where the time period is determined at least partially according to a charging condition of the at least one capacitance.

9. The hybrid lamp apparatus of claim 1, further comprising a diode with an anode terminal coupled to the upper DC bus output of the rectifier and a cathode terminal coupled with the primary lamp circuit.

10. The hybrid lamp apparatus of claim 1, where the auxiliary lamp is an incandescent lamp.

11. The hybrid lamp apparatus of claim 1, where the switching device is a triac.

* * * * *